United States Patent [19]

Langer

[11] 4,324,128
[45] Apr. 13, 1982

[54] HYDRODYNAMIC SUPPORT BEARING FOR A BELT ON A TIRE TESTING MACHINE

[75] Inventor: William J. Langer, Eden Prairie, Minn.

[73] Assignee: MTS Systems Corporation, Eden Prairie, Minn.

[21] Appl. No.: 121,399

[22] Filed: Feb. 14, 1980

[51] Int. Cl.[3] .............................................. G01M 17/02
[52] U.S. Cl. ............................................. 73/8; 73/146
[58] Field of Search ..................... 198/811; 308/5 R; 73/146, 117, 8

[56] References Cited

U.S. PATENT DOCUMENTS

| 478,502 | 7/1892 | Corning | 198/811 |
|---|---|---|---|
| 3,763,699 | 10/1973 | Sangster | 73/117 |
| 4,076,335 | 2/1978 | Ahmed | 308/5 R |
| 4,238,954 | 12/1980 | Langer | 73/146 |

FOREIGN PATENT DOCUMENTS 689963  4/1953  United Kingdom ............... 198/811

OTHER PUBLICATIONS

Calspan Research Facility, SAE Report #730582 by Bird and Martin, pp. 1–16, May 1973.

Primary Examiner—Kyle L. Howell
Assistant Examiner—Denis E. Corr
Attorney, Agent, or Firm—Kinney, Lange, Braddock, Westman and Fairbairn

[57] ABSTRACT

A bearing support for a flexible belt used on a tire testing machine wherein the belt forms the simulated road surface. The bearing is a hydrodynamic bearing which insures low friction between the belt and its support underneath the tire being tested.

8 Claims, 4 Drawing Figures

HYDRODYNAMIC SUPPORT BEARING FOR A BELT ON A TIRE TESTING MACHINE

BACKGROUND OF THE INVENTION

1. Field of the Invention

The present invention relates to a hydrodynamic support bearing for an endless belt used in tire testing machines.

2. Prior Art

Tire testing machines of various types have been advanced, and many use some type of a belt that simulates a road surface. Usually the belt of this type has to be supported on some type of a central support, and a typical air bearing support is shown in U.S. Pat. No. 3,763,699. While the test apparatus shown in this patent comprises supports for all four wheels of an automobile being tested, the load from the wheels is reacted from a fluid bearing utilizing air that is emitted through a plurality of openings to provide air suspension for the belt.

In some installations, water has been used as a hydrostatic bearing to support the belt. Water is exhausted from a plurality of jets impinging on the bottom of the belt under pressure sufficient to support the belt. Substantial pressure and flow are required for that type of bearing.

Additionally, rollers have been used for supporting belts directly underneath a tire that is being tested.

It should also be noted that air bearings are described in the Society of Automotive Engineers Report No. 730582 entitled "The Calspan Tire Research Facility: Design, Development and Initial Test Results" by K. B. Byrd and J. F. Martin.

SUMMARY OF THE INVENTION

The present invention relates to a hydrodynamic bearing for supporting a moving, flexible belt used in testing automotive tires. The bearing has a surface with grooves that are generally perpendicular to the direction of movement of the belt, and a supply of liquid, such as water, to these grooves. The grooves are oriented parallel to each other with lands in between. The supply of water is regulated so that the belt is supported on a layer of water. The motion of the belt, which is flexible, shears the liquid between the grooves. The land length between the grooves is selected so that the belt develops sufficient fluid pressure between the surface of the bearing and the belt to support the land.

The bearing requires a much lower flow of fluid (liquid) and less power is consumed in the bearing than hydrostatic bearings. Also, the present device is much less susceptible to damage due to scratches on the surface.

DESCRIPTION OF THE PREFERRED EMBODIMENT

Figure 1:
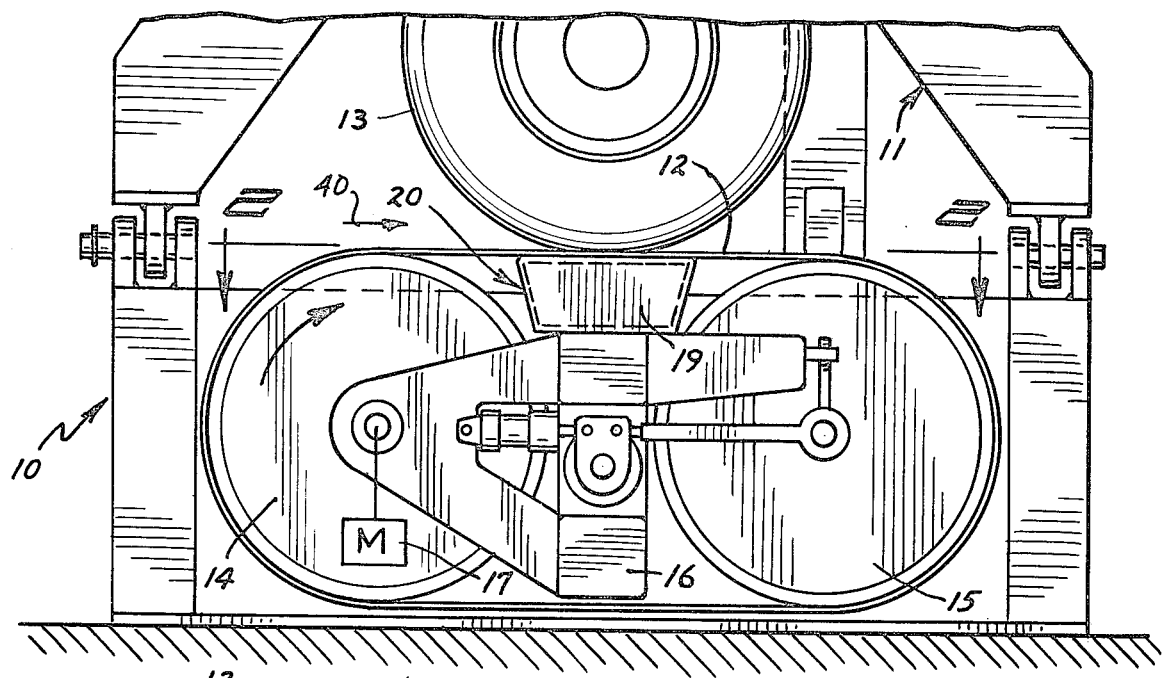
FIG. 1 is a fragmentary side elevational view of a testing machine utilizing a support for the road simulation belt made according to the present invention.

FIG. 1 is a schematic showing of a typical endless belt tire tester. A main frame 10 supports a tire loading frame apparatus shown only fragmentarily at 11. The tire loading frame 11 provides means for mounting a wheel and tire 13 so that the wheel and tire can rotate, as it engages the upper surface of a flexible imperforate belt 12 which simulates a road surface. The tire can be loaded in vertical direction under power against a belt 12. The belt 12 is mounted over first and second drums 14 and 15 respectively, one of which is powered from a suitable motor shown schematically at 17. The drums 14 and 15 are mounted in suitable bearings for rotation relative to a mounting framework 16 that is supported on the frame 10 in a desired manner.

By powering one of the drums or rollers 14 and 15, the belt 12 will be powered and as the tire 13 engages the belt under load, the tire will rotate. The load with which the tire 13 engages the belt is variable, and the speed of the belt also is variable. The area of contact of the tire on the top length of the flexible belt 12 is called the "tire patch area" and the flexible belt is supported in the patch area through a bearing assembly illustrated schematically at 20 on the opposite side of the belt from tire 13.

The belt 12 is generally a very thin flexible, imperforate stainless steel belt on the order of 0.030 to 0.040 inches thick and is driven at lineal speeds ranging between 2 and 80 MPH in a normal test system. The belt 12 can be driven in either direction of movement. The upper surface of the belt can be coated with material which simulates a road surface.

Figure 2:
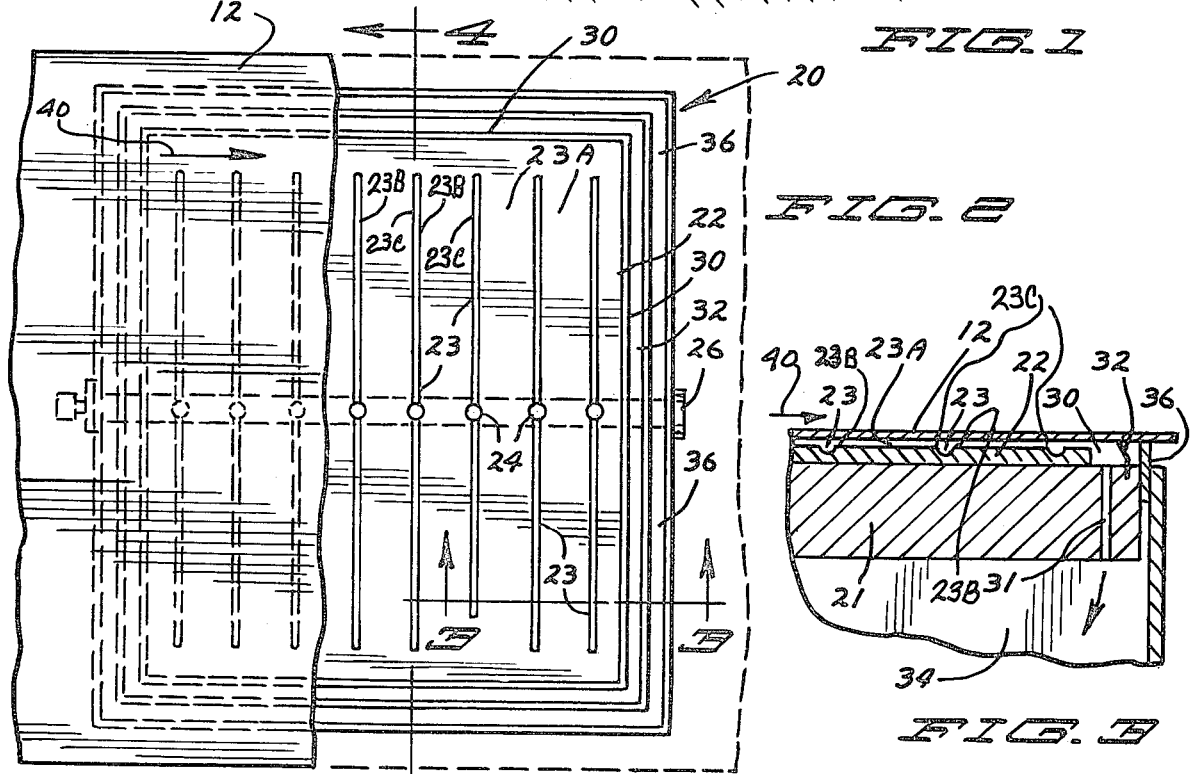
FIG. 2 is a top plan view of the bearing made according to the present invention taken as on line 2—2 in FIG. 1, with parts in section and parts broken away.
Figure 3:
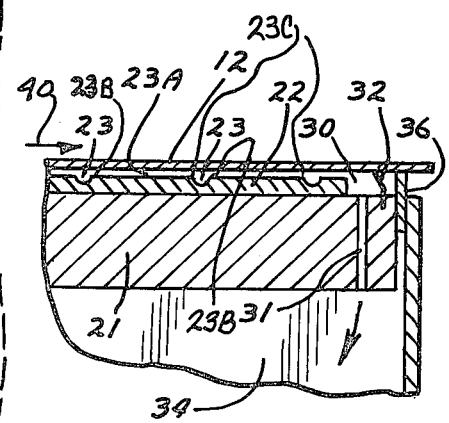
FIG. 3 is a sectional view taken as on line 3—3 in FIG. 2.
Figure 4:
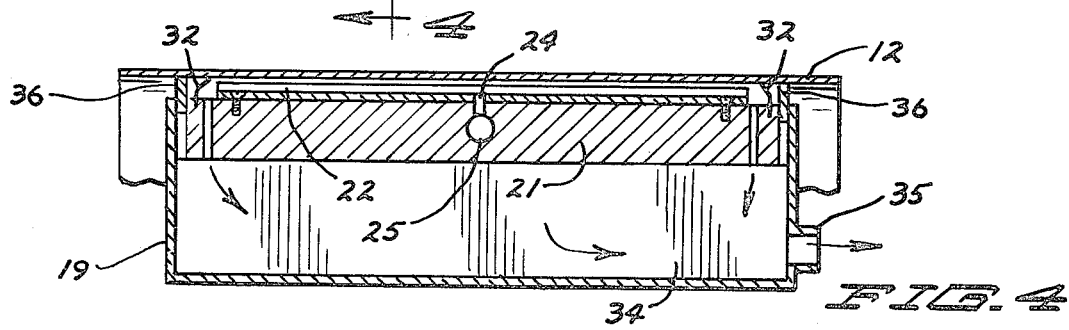
FIG. 4 is a sectional view taken as on line 4—4 in FIG. 2.

The bearing assembly 20 as shown perhaps best in FIGS. 2 and 3 comprises a support bed 21 that can be mounted to the framework 16 in any desired manner as shown by walls 19 which form a housing or enclosure below the support bed. At the upper edge of the support bed, in the form shown, there is a plate of low friction material such as Teflon or the like, which is indicated at 22. This plate of low friction material is desirable to prevent scoring of the stainless steel belt if there is surface to surface contact during use.

In order to support the belt 12 on a hydrodynamically created liquid film, the plate 22 has a number of substantially evenly spaced, substantially parallel grooves 23 defined therein. These recesses or grooves 23 extend generally laterally (perpendicular) to the direction of belt movement short of the peripheral edges of the plate 22 of the low friction material. Thus the grooves are closed end grooves. Each of the grooves 23 is open through a suitable orifice 24 to a pressure conduit 25 that leads to a source of fluid illustrated schematically at 26.

The source of fluid generally is a liquid of desired viscosity. In the form shown, water is used. The flow of liquid is regulated to provide make-up water, but the pressure necessary to support the belt 12 on a fluid bearing is generated by the belt 12 tending to shear the liquid as the belt moves over the lands 23A between the grooves 32. The pressure developed is directly dependent upon the load applied in the tire patch area for the tire 13. The source of liquid must supply sufficient flow for the makeup liquid, but the supply pressure can be relatively low.

Passageway 25 is plugged at one end as shown at 26, and thus any water that passes into the passageway 25 is forced out through the orifices 24 and laterally into the grooves 23 so that it spreads out a substantial portion of the lateral width of the belt 12.

The plate 22 as shown terminates short of the peripheral edges of the support bed 21. This spacing forms a collector ring 30 between the peripheral edges of the plate 22 and provided a lip type seal 32 that is a perimeter seal mounted all the way around the support block 21. Passageway or collector ring 30 formed by the lip type seal 32 is open to a plurality of drain passageways 31 that extend downwardly into a drain compartment or chamber 34 within housing 19. The compartment 34 can have a fitting 35 that leads to a suitable drain. In addition to the sealing lip 32, a felt perimeter seal or wiper 36 is mounted adjacent to the outside edge of the block 21 to aid in preventing liquid from escaping. The bearing support block 21 can be made out of suitable metal, and of course the scrapers or wipers can be made of suitable flexible material.

As the belt 12 moves, and liquid (water) is supplied from the source to each of the grooves 23 through the orifices 24, the hydrodynamic pressure under the belt is maintained as a function of the load on the belt. Water coming out of the grooves 23 at the trailing edge 23B thereof, in relation to the direction of movement of the belt (arrow 40) is subjected to shear forces by the moving belt. The amount of shear of the liquid is a function of the flexible belt loading and speed and the viscosity of the liquid.

By way of illustration, the liquid pressure between the top surface of plate 22 and the bottom surface of belt 12 is thus at a minimum at the leading edges 23B. The shear in the liquid builds up hydrodynamic pressure as the liquid is moved toward the next groove 23. The leading edge 23C of the next groove is the region of greatest liquid pressure. The pressure drops off again as the belt crosses the next groove. Thus the water or liquid under the belt would be "saw toothed" in cross section across the lands 23A (between the grooves). In FIG. 3 this can be visualized in that the water pressure would be lowest at the trailing edge 23B for the left most groove in the drawing and would increase as a ramp toward the leading edge 23C of the next groove 23 toward the right (in direction of belt movement as shown by arrow 40). At the edge 23C the pressure would drop to practically zero as the water moves into the groove.

Stated another way, as the belt moves it actually forms a wedge of water from the leading edge (23B) of one of the lands 23A to the trailing edge (23C) of that same land so that the thickness of water under the belt is a minimum immediately adjacent the edge 23C of each of the grooves.

The flexible belt can average out the pressure across the surface of the lands at a level sufficient to support the belt. The hydrodynamic pressure does tend to increase as the patch load increases and as belt speed (velocity) increases for a liquid of the same viscosity.

The viscosity of the liquid, the spacing of the grooves and providing sufficient make-up liquid all contribute to making an operable bearing.

In hydrostatic bearings controlled clearances are required, while the hydrodynamic bearing disclosed herein develops pressure all across the belt without having controlled clearances. Thus scratches on the bearing surfaces do not affect operation adversely and foreign particles are less of a problem. The volume of liquid is substantially less with the present device. An ordinary garden hose connected to a faucet is adequate for water supply.

The number of grooves is selected so that in the supported region the belt acts as if it is stiff. If the lands are too long in direction of belt movement, the belt will deflect and not be supported on a water layer. Thus the grooves are spaced so under the speed and loads of operation of the belt, the water builds a continuous wedge from the trailing edge of one groove to the leading edge of the next and the layer of water effectively has a continuous rise in pressure from one groove to the next.

What is claimed is:

1. In an endless flexible belt assembly including a belt having a lateral width, and a pair of rollers supporting the belt for movement in a closed path, said rollers being spaced apart to provide a center belt length between the rollers with the belt moving in a first direction in the center length and being loaded in the center length, the improvement comprising a hydrodynamic bearing mounted in position to support the center belt length, said hydrodynamic bearing comprising a block member having a surface that is generally planar and which supports the center belt length on a side thereof opposite the side on which the belt is being loaded, a plurality of generally parallel grooves extending generally perpendicular to the direction of movement of said belt and spaced apart in direction of movement of the belt, said grooves being of length less than the lateral width of said belt and terminating short of the edges of said block member, and means to supply a liquid to each of said grooves at a low pressure in a desired amount sufficient so the pressure necessary to support the belt on a liquid film is generated by the belt creating shear in the liquid between the grooves to provide hydrodynamic pressure between the belt and the block member as a function of belt velocity relative to the block member, liquid viscosity and loading on the belt as the belt is moved.

2. The assembly of claim 1 wherein said grooves are spaced in direction of movement of the belt a distance selected to provide for a substantially continuous increase in liquid pressure caused by shear from one groove to the next in direction of belt movement.

3. The assembly of claim 2 and a flexible peripheral seal mounted on said block and engaging the adjacent surface of said belt to retain the liquid within the perimeter.

4. The assembly of claim 1 and orifice means controlling the liquid flow to each of the grooves.

5. The assembly of claim 2 wherein said belt is an imperforate belt of stainless steel in the range of 0.030 to 0.040 inches thick.

6. In an endless flexible belt assembly including a belt having a lateral width, and a pair of rollers supporting the belt for movement in a closed path, said rollers being spaced apart to provide a center belt length between the rollers with the belt moving in a first direction in the center length and being loaded in the center length, said belt being loaded from the top thereof over an area of load contact, the improvement comprising a hydrodynamic bearing mounted in position to support the load on the center belt length, said hydrodynamic bearing comprising a block member, said block member having a surface that is generally planar and which supports the center belt length on a side thereof opposite the area of load contact, a plurality of generally parallel grooves formed in said surface and extending laterally to the first direction and being spaced apart in the direction of belt movement, said grooves terminating short of the edges of said block member and being covered by the belt as the belt moves, and means to supply a liquid of desired viscosity to each of said grooves at a low pressure in a desired amount, the belt being moved at a relative velocity across the surface of the block member to shear the liquid and to thereby generate hydrodynamic pressures between the belt and the block member surface necessary to support the belt on a fluid bearing by shear in the liquid between the grooves as the belt is moved.

7. The apparatus of claim 6 including means to move the belt relative to the block member and to load the belt in a direction toward the block member, said grooves being spaced relative to each other in relation to the belt velocities and loads so that the liquid builds a continuous wedge from the trailing edge of one groove to the leading edge of the next groove, and the layer of liquid effectively has a continuous rise in pressure from one groove to the next in direction of movement of the belt relative to the block member.

8. The improvement of claim 6 wherein the block member surface has lands which are generally planar between the spaced apart grooves, and wherein the liquid supplied is water, the layer of water between the grooves effectively having a continuous rise in pressure from one groove to the next in direction of movement of the belt, with the grooves containing water at a pressure no greater than the low supply pressure.

* * * * *